United States Patent [19]

Okubo

[11] Patent Number: 4,461,028
[45] Date of Patent: Jul. 17, 1984

[54] IDENTIFYING SYSTEM

[75] Inventor: Hiroshi Okubo, Chiba, Japan

[73] Assignee: Omron Tateisielectronics Co., Kyoto, Japan

[21] Appl. No.: 311,456

[22] Filed: Oct. 14, 1981

[30] Foreign Application Priority Data

Oct. 15, 1980 [JP] Japan .................................. 55-144983

[51] Int. Cl.³ .............................................. G06K 9/66
[52] U.S. Cl. ........................................... 382/15; 382/7
[58] Field of Search ................... 382/15, 57, 48, 7, 10, 382/42; 283/8, 57–59; 235/487, 494, 379, 380; 381/42

[56] References Cited

U.S. PATENT DOCUMENTS 3,191,150 6/1965 Andrews ................................. 382/15
4,054,749 10/1977 Suzuki et al. ........................... 381/42
4,201,978 5/1980 Nally ........................................ 382/7

FOREIGN PATENT DOCUMENTS 2087548 5/1982 United Kingdom .................. 382/10

Primary Examiner—John C. Martin
Assistant Examiner—Michael Parker
Attorney, Agent, or Firm—Cushman, Darby and Cushman

[57] ABSTRACT

A system for identifying a seal stamp comprises a memory having stored therein two impression reference patterns, namely an original reference pattern and a latest reference pattern, for the seal stamp. An impression pattern read by a reader is collated with the latest reference pattern, and when the patterns are found to match, the read impression is verified and the latest reference pattern in the memory is updated with use of the read impression pattern. If the patterns are found not to match by the collation, the read impression pattern is collated by the original reference pattern. When the two patterns are found to match by this collation, the read impression is verified. The original reference pattern is updated when desired. The system is also useful for identifying other objects such as speech.

8 Claims, 5 Drawing Figures

IDENTIFYING SYSTEM

BACKGROUND OF THE INVENTION

The present invention relates to systems for identifying objects, such as seal stamps and speeches, the characteristics of which tend to change with lapse of time or for some other cause, and more particularly to a system for identifying an object which has been registered in advance by detecting the pattern of the object and checking whether or not the detected pattern is identical with a reference pattern characteristic of the object and stored in a memory. Exemplary of such systems are a system for verifying a seal stamp impression on a document with use of a registered impression, and a system for identifying an uttered speech by checking whether or not the speech is identical with a registered speech.

The term "seal stamp" is used in this specification and appended claims as including seals having a name, abbreviation thereof, symbol, emblem or mark engraved on a material, such as wood, ivory, horn, crystal, stone, metal, glass or synthetic resin, for authenticating documents, indicating ownership and other purposes, stamps of rubber or synthetic resin shaped to impress the name of a company or individual, signature, address or the like instead of writing for authenticating documents, indicating ownership and other purposes, and so-called seal stamps of metal bearing letters or a symbol or mark in intaglio or relief for forming indentations or projections on documents to represent the desired item of information for similar purposes or to form a hole. Further the term "document" refers to a sheet or bound sheets of paper or some other material having specified items of information written or printed thereon. Such documents include, for example, bills and notes.

As an example of identification, verification of the impression of a seal stamp will be described. Impressions on documents are verified by checking whether or not the impression is identical with the registered impression. Usually this is done by inspecting the two impressions with the eyes. Accordingly when a large number of documents must be checked for the verification of impressions, the procedure requires much time and labor and is therefore inefficient.

In the case of an electric system, for example one equipped with a computer, for automatically identifying or verifying impressions, the system has a memory having stored therein impression reference patterns of registered seal stamps, and a reader for reading impression patterns on documents. The computer collates a read impression pattern with the corresponding reference pattern in the memory to check whether or not the two patterns are identical.

When a seal stamp is used repeatedly a large number of times, the impressing surface wears or becomes damaged inadvertently, so that the impression changes with the lapse of time. Further fragments of paper fibers of documents and dust tend to adhere to the impressing face of the seal stamp. When the seal stamp is used without removing such dust, it is likely that the impression differs from the registered impression. Thus even when the impression pattern of a genuine seal stamp is read and collated with the registered reference pattern of the stamp by the verifying system, the two patterns will not always match, with the likelihood that the impression on the document is judged as being not genuine.

In identifying objects, such as seal stamp impressions and speeches, the characteristics of which alter with time, errors are thus likely to occur.

SUMMARY OF THE INVENTION

An object of the present invention is to provide a system for identifying objects correctly at all times even when the characteristics of the object alter with the lapse of time or for some other cause.

Another object of the invention is to provide a system for verifying impressions of seal stamps correctly at all times even when the stamp wears, becomes partly damaged or otherwise changes with time due to a long period of use.

Another object of the invention is to provide a system for verifying impressions of seal stamps correctly even when the stamp has fibrous fragments, dust or the like lodged in its impressing face.

The present invention provides a system for identifying an object which has been registered in advance by detecting the pattern of the object and collating the detected pattern with a reference pattern which is characteristic of the object and stored in a memory. The system is characterized by means for updating the reference pattern in the memory with use of the pattern of the object when the object is identified by collation. Since the reference pattern in the memory is updated at all times by the genuine pattern of the object, the identity of the object can be established correctly at all times even when the characteristics of the object alter.

The present invention is especially useful when embodied as a system for verifying seal stamp impressions. The verifying system comprises a memory having stored therein impression reference patterns of registered seal stamps, an impression reader for reading the patterns of impressions on documents, means for collating a read impression pattern with the corresponding reference pattern, and means for updating the reference pattern in the memory with use of the read impression pattern where the impression of the read pattern is verified by the collation. Since the reference pattern in the memory is updated at all times with use of the genuine read impression pattern, the memory has stored therein the latest reference pattern at all times. Accordingly, even when the impressing face of the seal stamp changes with time to give an altered impression, impressions can be verified correctly at all times to eliminate the possible likelihood that the impression formed by a genuine seal stamp will be erroneously judged as being not genuine.

Preferably the memory has stored therein two impression reference patterns, i.e. an original reference pattern and latest reference pattern, for one seal stamp. First, a read impression pattern is collated with the latest reference pattern. When the two patterns are found to match, the impression of read pattern is judged as being genuine, and the latest reference pattern in the memory is updated with the read impression pattern. When the collation reveals that the two patterns do not match, the read impression pattern is then collated with the original reference. When the two patterns are found to match by this collation, the read impression is judged as being genuine. When the seal stamp has deposited thereon fibrous fragments or dust and if the seal stamp is used more than once without removing the deposit, the latest reference pattern also includes the data afforded by the impression of deposit, so that the impression pattern then read matches the latest reference pattern. If the stamp is cleaned to remove the deposit, it is likely that a read impression pattern will not match the latest pattern, but the pattern invariably matches the original reference pattern. Thus the read impression is accepted as being genuine. The matching of impression patterns does not always mean that all the data bits constituting one pattern match those of the other pattern, but also means a match between predetermined numbers of bits as will be described later.

Further preferably the original reference pattern in the memory is also updated with use of a read impression pattern when the read pattern matches the original reference pattern, or when such matching occurs a plurality of times.

Other features and advantages of the invention will become apparent from the following embodiments described with reference to the drawings.

DESCRIPTION OF THE PREFERRED EMBODIMENTS

Figure 1:
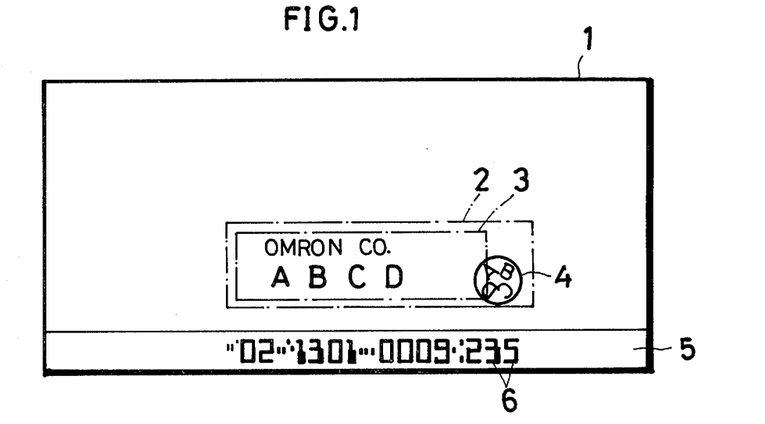
FIG. 1 shows an example of document bearing the impressions to be checked by an impression verifying system.

FIG. 1 shows an example of document bearing the impressions to be verified. The document is a promissory note 1 having an area 2 bearing the name of the promisor. For example, when the promisor is a company, the area 2 bears an impression 3 showing the name of the company and signature of its representative in a black or blue ink, and an impression 4 formed by his seal in a vermilion ink. These impressions 3 and 4 are verified by the impression verifying system to be described later. The note 1 has along its lower edge a clear band 5 bearing data 6 necessay for the transaction, such as the number of the bank concerned, account number of the promisor and note number. The data is printed with an ink containing a magnetic material in the letter style used for the magnetic ink character recognition system (hereinafter referred to as "MICR").

Figure 2:
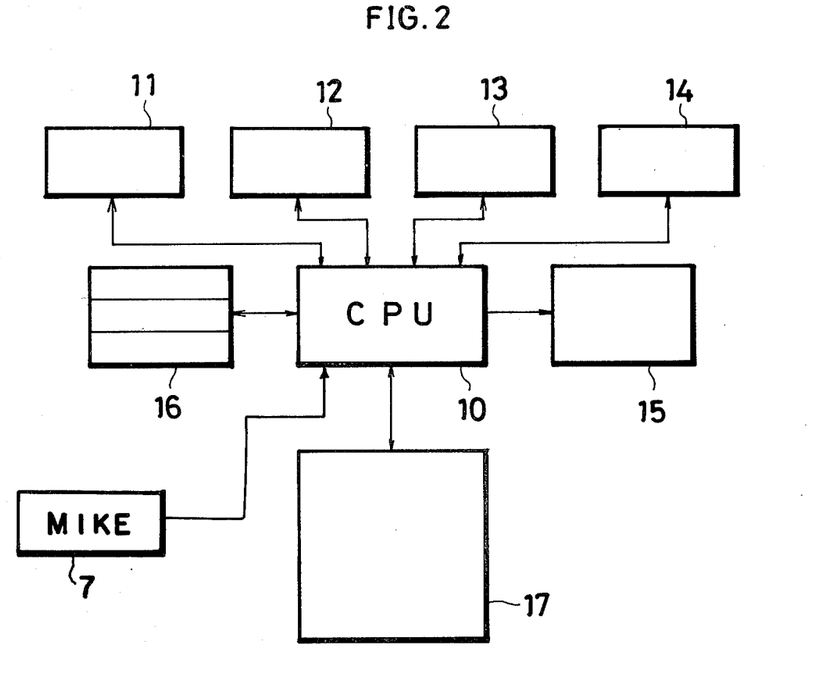
FIG. 2 is a block diagram showing the electrical construction of the system.

FIG. 2 shows the electrical construction of the impression verifying system. This system comprises a document feeder 11, MICR reader 12, impression reader 13, stacker 14, display unit 15 and central processing unit (CPU) 10. The CPU 10 has a register group 16 and memory 17. A microprocessor is desirable as the CPU 10.

A multiplicity of promissory notes 1 placed into the system are forwarded through the readers 12 and 13 to the stacker 14 one by one.

The reader 12 reads the MICR data 6 on the note 1 during the transport of the note 1 by the feeder 11. The reader 13 reads the impressions 3 and 4 on the note 1 and produces digital impression signals. The reader 13 has a blue or dark color filter and a vermilion or red filter for separating the black or blue stamp impression 3 from the vermilion seal impression 4, and a multiplicity of optical sensors or a TV camera or like image pickup unit for detecting the color tone (density) of each picture element of the impressions 3 and 4 through the filters.

With the present embodiment, notes are divided into genuine notes, those which are not discriminatable as to genuineness and those which are not genuine (not matching) according to the result of verifying the impressions. Based on the result of verification by the CPU 10, the notes 1 sent forward via the reader 13 are classified into the above three groups, which are accommodated in separate portions within the stacker.

The display unit 15 displays the state of operation of the system and results of verification, e.g. power supply on, the system in or out of operation, number of documents checked, number of genuine documents, number of indiscriminatable documents and number of non-matching documents.

The CPU 10 controls the units 11 to 14 and collate impression patterns to verify the impressions. The register group 16 includes three registers A, B and C. Registers A and B store the pattern data of the stamp impressions 3 and seal impressions 4 read by the reader 13. The register C stores the account numbers included in the items of data 6 read by the reader 12.

Figures 3, 4, 5:
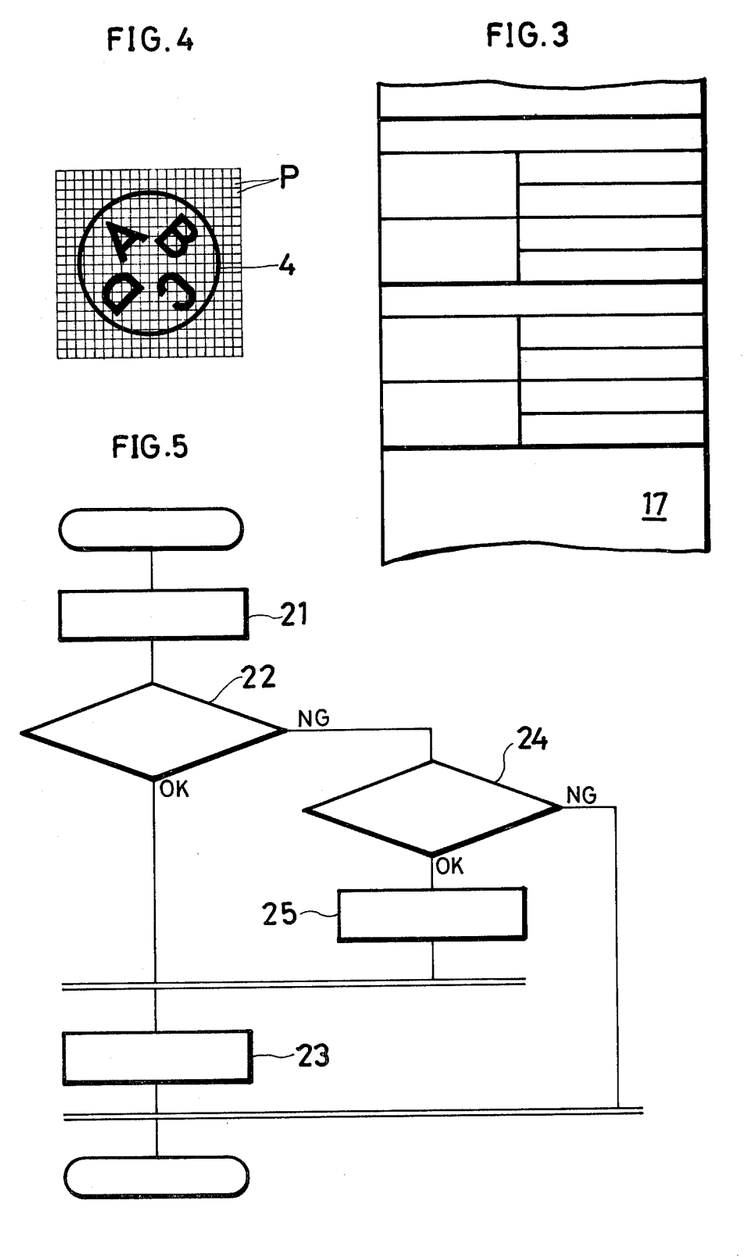
FIG. 3 shows part of the area of a memory for storing impression reference patterns.
FIG. 4 shows how the impression is read by an impression reader.
FIG. 5 is a flow chart showing the steps of verifying impressions.
Figure 3:
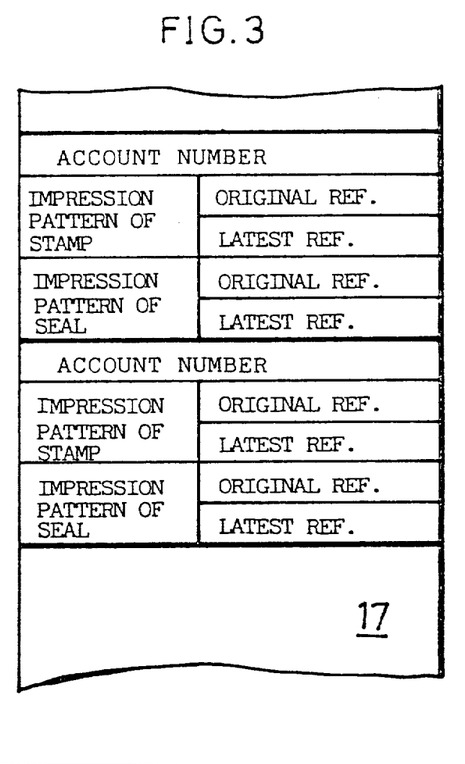

The memory 17 has an area for storing account numbers and the impression patterns of the seal stamps registered for the accounts. With reference to FIG. 3, this area has stored therein for each account the account number, an original reference pattern and latest reference pattern of the impression of the stamp used for the note 1, and an original reference pattern and latest reference pattern of the impression of the seal. When an account is opened, the seal and stamp to be used for transactions on the account are registered. For registration, such a seal stamp is distinctly impressed on a specified sheet of paper, and the impression is read by the reader 13 and converted to an impression pattern comprising a multiplicity of items of digital data. The impression pattern is stored in the memory 17 as an original reference pattern and latest reference pattern. Accordingly at the time of registration of the seal stamp, the original and latest reference patterns are identical. The latest reference pattern is updated every time the seal stamp is used, i.e. every time the impression is checked for verification. As will become apparent later, the original reference pattern is updated when needed. Instead of storing the account number in the impression pattern area, the head address of the location where the reference patterns for each account are stored can be made to correspond to the account number.

With reference to FIG. 4 showing the impression 4, the image of an area including the impression 4 is picked up by the image pickup unit of the reader, and the output signals are discriminated with reference to a suitable threshold level, whereby an item of 1-bit digital data, 0 or 1, representing the density of each picture element P is obtained. The collection of these items of digital data is an impression pattern. The impression pattern of the stamp 3 is obtained by the same method. When a read impression pattern is found to be genuine, the read impression pattern becomes a reference pattern to update the reference pattern in the memory 17.

When an impression pattern read by the reader 13 matches the corresponding reference pattern stored in the memory 17 with respect to, for example, at least 80% of the bits constituting each of the patterns, the read impression is verified (match of patterns). When 60% to less than 80% of the bits are found to match, the impression is judged as being indiscriminatable. If less than 60% of the bits are found to match, the impression is judged as being not genuine (non-matching).

The reference pattern may be prepared in the following manner. The output signals from the image pickup unit are subjected to A-D conversion to obtain an item of 8-bit (256 degree) digital data representing the color tone of each picture element P. The collection of these items of data will be referred to as a color tone pattern. When a read impression is found to be genuine by collation, the items of data (comprising 8 bits for each picture element) of the two color tone patterns are added for each picture element, and a threshold value predetermined for each picture element is subtracted from the result. The collection of the results of subtraction, which is also a color tone pattern, is used as a reference pattern. Since the characteristics of the impression is made pronounced by the addition, this method fully eliminates noise components. When a read color tone pattern is to be collated with the reference color tone pattern, the 8-bit data of each picture element constituting the color tone pattern is converted to 1-bit data, 1 or 0, according to the data value, whereby the pattern is converted to the collection of the items of 1-bit data each representing the density of each picture element. The two patterns thus converted are collated to verify the impression according to the foregoing criteria based on the number of matching bits.

FIG. 5 shows the steps of verifying impressions by the CPU 10. The data 6 and the impressions 3, 4 on the note 1 are read by the readers 12 and 13 respectively and the resulting items of data are stored in the register group 16 (step 21). Based on the account number stored in the register C, the corresponding stamp and seal reference patterns are retrieved from the reference pattern area of the memory 17. The impression patterns in the registers A and B are collated with the corresponding latest reference patterns individually (step 22). When the impressions 3 and 4 are verified, the corresponding latest reference patterns are updated with use of the impression patterns stored in the registers A and B individually (step 23).

When one or both of the impression patterns in the registers A and B are indiscriminatable or found not to match, the patterns in the registers A and B are then collated with the corresponding original reference patterns individually (step 24). When the read impressions are verified by this collation, the original reference patterns in the memory 17 are updated by the pattern in the registers A and B individually (step 25). The latest reference patterns are also updated individually (step 23). When the patterns concerned are found to match by one of steps 22 and 24, the impression is genuine. Since a signal indicating this is given to the stacker 14, the note 1 is placed in a location of the stacker 14 for accommodating genuine notes. If the note 1 is verified neither by step 22 nor by step 24, the note is accommodated in a suitable portion of the stacker 14 according to the judgment.

Although the stamp impression 3 and seal impression 4 are collated with the corresponding reference patterns individually in the foregoing embodiment, either one of the impressions only may be so collated. The original reference pattern may be updated when the collation of step 24 is repeated a predetermined number of times for the same seal stamp. The number of times of the collation of step 24 is counted by a counter. This counter may be used for counting the number of times impressions are found genuine by the collation of step 24. The updating of the original reference pattern may be omitted.

Figure 6:
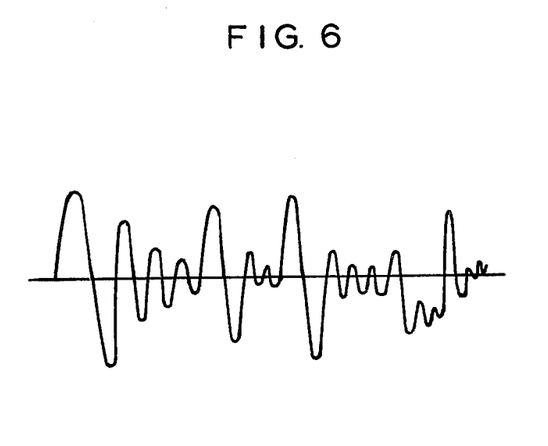
FIG. 6 is a schematic diagram of a speech signal.

The present invention is useful also for collating speech analysis patterns. When a word is spoken, the speech is analyzed by a specified method, and the resulting pattern is stored in a memory. A speech signal emitted by a mike 7 (an example of which is shown in FIG. 6) is analyzed by the same method, and the resulting pattern is collated with the reference pattern stored in the memory. When the speakers are found to be identical by the collation, the reference pattern in the memory is updated. Since the human speech analysis pattern alters also with time, the speaker can be identified correctly at all times if the reference pattern is updated every time patterns are collated or as desired. Such a system is useful for automatic cash dispensers or like banking transactions processing systems which involve the necessity of checking whether or not a person who is to perform a transaction is qualified. The present invention is further useful for objects having features amenable to pattern recognition.

What is claimed is:

1. A system for indentification verification by comparing a current information input with information previously stored, comprising:
   a memory having, for each of a plurality of items to be identification verified, a first memory area for storing original reference information for that item and a second memory area for storing latest reference information for that item;
   means for generating from an item to be identified, current impression information;
   first means for comparing, based on first predetermined criteria, the current impression information with the latest reference information stored in said second memory area associated with that item;
   means, in the event of a favorable comparison by said first comparing means, for updating the latest reference information in memory based on the current impression information;
   second means for comparing based on second predetermined criteria and in the event of an unfavorable comparison by said first comparing means, the current impression information with the original reference information in said first memory area associated with that item; and
   means, in the event of a favorable comparison by said second comparing means, for updating the original reference information based on the current impression information.

2. A system according to claim 1 wherein said second means for comparing comprises means for comparing the current impression information with the original reference information from memory more than once.

3. A system according to claim 1 wherein said item is a human being and wherein said original reference information, latest reference information and current impression information are information related to a speech signal.

4. A system according to claim 1 wherein said item is document bearing a visible pattern and wherein said original reference information, latest reference information and current impression information are information related to such patterns.

5. A system according to claim 4 wherein said item is a document and said visible pattern is a seal stamp.

6. A system according to claim 1 wherein the items to be identified are documents each bearing a code of a particular user and wherein the latest reference information and original reference information are retrieval from said memory by addressing said memory based on a code read from a document to be identification verified.

7. A system according to claim 1 wherein said means for updating the latest reference information comprises means for substituting for it the current impression information.

8. A system according to claim 1 wherein said means for updating the original reference information comprises means for substituting for it the current impression information.

* * * * *

UNITED STATES PATENT AND TRADEMARK OFFICE
CERTIFICATE OF CORRECTION

PATENT NO. : 4,461,028
DATED : July 17, 1984
INVENTOR(S) : Hiroshi OKUBO

It is certified that error appears in the above-identified patent and that said Letters Patent is hereby corrected as shown below:

Figure 1 should include in the upper left corner the words --PROMISSORY NOTE-- and in the left center portion the word --PROMISOR--.

The blocks of Figure 2 should include labels as follows:

| Block Number | Label |
| --- | --- |
| 11 | DOCUMENT FEEDER |
| 12 | MICR READER |
| 13 | IMPRESSION READER |
| 14 | STACKER |
| 15 | DISPLAY |
| 16 (upper portion) | REGISTER A |
| 16 (middle portion) | REGISTER B |
| 16 (lower portion) | REGISTER C |
| 17 | MEMORY |

UNITED STATES PATENT AND TRADEMARK OFFICE
CERTIFICATE OF CORRECTION

PATENT NO.   : 4,461,028
DATED        : July 17, 1984
INVENTOR(S)  : Hiroshi OKUBO It is certified that error appears in the above-identified patent and that said Letters Patent is hereby corrected as shown below:

The portions of Figure 3 should be labeled as shown below:

FIG. 3

| ACCOUNT NUMBER | |
|---|---|
| IMPRESSION PATTERN OF STAMP | ORIGINAL REF. |
| | LATEST REF. |
| IMPRESSION PATTERN OF SEAL | ORIGINAL REF. |
| | LATEST REF. |
| ACCOUNT NUMBER | |
| IMPRESSION PATTERN OF STAMP | ORIGINAL REF. |
| | LATEST REF. |
| IMPRESSION PATTERN OF SEAL | ORIGINAL REF. |
| | LATEST REF. |

17

UNITED STATES PATENT AND TRADEMARK OFFICE
CERTIFICATE OF CORRECTION

PATENT NO. : 4,461,028
DATED : July 17, 1984
INVENTOR(S) : Hiroshi OKUBO

It is certified that error appears in the above-identified patent and that said Letters Patent is hereby corrected as shown below:

In Figure 5, the blocks should be labeled as follows:

| Block | Label |
|---|---|
| Uppermost (no reference numeral) | START |
| 21 | READING |
| 22 | COLLATING LATEST REF. |
| 23 | UPDATING LATEST REF. |
| 24 | COLLATING ORIGINAL REF. |
| 25 | UPDATING ORIGINAL REF. |
| Lowermost (no reference numeral) | END |

Signed and Sealed this

Twenty-fifth Day of June 1985

[SEAL]

Attest:

DONALD J. QUIGG

Attesting Officer

Acting Commissioner of Patents and Trademarks